United States Patent [19]

Peil

[11] 3,859,599

[45] Jan. 7, 1975

[54] SIGNAL ACQUISITION NETWORK FOR SIGNAL RECEPTION

[75] Inventor: William Peil, North Syracuse, N.Y.

[73] Assignee: General Electric Company, Syracuse, N.Y.

[22] Filed: Dec. 20, 1972

[21] Appl. No.: 316,914

[52] U.S. Cl. .................... 325/419, 325/423

[51] Int. Cl. .................... H03d 3/14

[58] Field of Search .................... 325/418–423, 325/330, 346, 464, 468; 331/110, 137, 140–142

[56] References Cited

UNITED STATES PATENTS

| | | | |
|---|---|---|---|
| 2,698,904 | 1/1955 | Hugenholtz | 325/419 |
| 3,127,577 | 3/1964 | Lapointe | 331/141 |
| 3,189,825 | 6/1965 | Lahti et al. | 325/346 |
| 3,217,259 | 11/1965 | Kotzebue et al. | 325/421 |
| 3,329,900 | 7/1967 | Graves | 325/421 |
| 3,358,234 | 12/1967 | Stover | 325/330 |
| 3,432,774 | 3/1969 | Fick | 331/141 |
| 3,480,865 | 11/1965 | Sanders | 325/419 |

*Primary Examiner*—Benedict V. Safourek
*Assistant Examiner*—Jin F. Ng
*Attorney, Agent, or Firm*—Richard V. Lang; Carl W. Baker; Frank L. Neuhauser

[57] ABSTRACT

The present invention relates to a signal acquisition network comprising an automatic phase/frequency control network suitable for automatic fine tuning with a wide frequency scanning feature, operative during signal acquisition. Wide frequency scanning is provided by a self quenching oscillator, which provides a low frequency "dithering" voltage to the AP/FC network to facilitate signal acquisition. The arrangement permits one to combine a large capture bandwidth with accurate narrow band tuning after "lock in". The invention is suitable for FM and TV application, and may be fabricated using integrated circuit techniques.

11 Claims, 5 Drawing Figures

SIGNAL ACQUISITION NETWORK FOR SIGNAL RECEPTION

BACKGROUND OF THE INVENTION

1. Field of the Invention

The present invention relates to automatic tuning systems and more particularly to an automatic tuning system having large tuning errors such as from push button and detent tuning systems and thus requiring an extended capture range. The invention is applicable to FM, both VHF and UHF TV receivers and is particularly suited for TV receivers employing synchronous video detection.

2. Description of the Prior Art

A conventional automatic fine tuning loop for a television receiver has a capture bandwidth which is small compared to the channel bandwidth (6 MHz) in order to provide for improved tuning accuracy during "lock in." As the capture bandwidth is made larger, the slope of the discriminator S curve becomes shallower and shallower, and the "zero" point becomes more difficult to ascertain. In narrow band systems, if the desired signal is off by 1½ MHz and within the adjacent channel sound trap, no information may be transmitted to the discriminator at all. Where, as in UHF, the uncertainty of the local oscillators is 3 MHz or more, conventional automatic fine tuning circuits will not work.

In synchronous detection systems such as those using a quadrature (Q) demodulator, a locked condition is obtained by operating on phase rather than on frequency directly. When unlocked, a beat note exists whose frequency is directly the mistuning error of the incoming signal. If this beat note can be passed, with gain, around the AFC loop, a d.c. voltage is generated which will tend to pull the incoming signal to its proper frequency. If the beat note is higher in frequency than the gain bandwidth of the loop, then a "pulling" of the mistuned oscillator does not occur and lock-in cannot be established.

If the bandwidth is made extremely large in a synchronous detection system in order to provide for errors of several megacycles, difficulties arise. First, the noise bandwidth of the loop is large and detrimental performance is incurred, both with respect to the capturing of signals with a poor signal to noise ratio and the maintaining of a high ultimate noise quieting for high level signals. In addition, there are problems associated with TV signals in that the single sideband portion, and in particular the chroma and sound portions, of said TV signal must be filtered out of the AFC loop or errors in the demodulation process occur. It is therefore mandatory for proper reception of the TV signals to maintain a narrow bandwidth in the AFC loop, typically below 100 kilohertz.

The problem then becomes one of being able to combine an arbitrarily large capture range while maintaining a narrow band AFC filter. In TV systems the dimensions of this problem are particularly acute in the UHF ranges where detent tuner error and drift are maximized and are in the order of 3 megahertz or more.

If one proposes to supply a scanning voltage to the AFC network during acquisition to avoid the need for loosening control accuracy during locked in operation, the method of sensing the need for such scanning and then of deactivating the scanning process, are particularly critical. The arrangement should be responsive to improper tuning upon channel selection and yet be immune to normal ranges of fading and independent of the modulation content of the signal.

In new applications, whether for FM or VHF-UHF television application, the requirements must now be achieved in the context of circuit configurations which are compatible with solid state circuitry, are suitable for integrated circuit implementation, are economic of the nonintegrable components, and require minimum additional power consumption. In television applications, the system should be compatible with the wide band synchronous video detection systems.

SUMMARY OF THE INVENTION

Accordingly, it is an object of the present invention to provide an improved signal acquisition network for signal reception.

It is a further object of the present invention to provide an improved signal acquisition network wherein a large capture frequency range is combined without a reduction in tuning accuracy.

It is another object of the present invention to provide an improved signal acquisition network having a large capture frequency suitable for automatic fine tuning in VHF and UHF television reception.

It is still another object of the invention to provide an improved signal acquisition network having a large capture frequency suitable for use in a television receiver using synchronous detection.

These and other objects of the present invention are achieved in accordance with the invention in a signal acquisition network comprising a first oscillator having a predetermined latent forward gain and having a low sub-audible) frequency of oscillation, and an automatic phase/frequency control network comprising an oscillator subject to electrical control, a detector which develops a corrective electrical signal to maintain the second oscillator and received signal in proper tuned relationship once lock-in has occurred, the network exhibiting a gain in excess of the latent forward gain of the first oscillator at its operating frequency. Means are further provided coupling the first oscillator to the electrically controlled second oscillator to cause the frequency of the latter to swing during the acquisition process over a range exceeding the lock-in range of the AFC network and through the frequency of the signal being acquired. Means are also provided to couple the detected output, which contains the low frequency oscillation (once lock-in has occurred) back to the low frequency oscillator. This coupling is phased to provide excess degenerative gain and quench the oscillator upon lock-in.

In accordance with another aspect of the invention, the oscillator is a harmonic oscillator having a lead RC phase shift network and a lag RC phase shift network which establish a low resonant frequency at the point where their phase shifts are equal and opposite.

In accordance with a more specific aspect of the invention, the oscillator has a three electrode gain element, having two input electrodes and an output electrode, with a positive feedback connection to the first input electrode. The lag RC network is coupled to the first input electrode and the lead RC network to the second input electrode. Preferrably, the lead RC network is in the form of a "doublet" having an amplitude response which transitions from one plateau to a second different plateau by a path having a first and a second break. Thus, one may select the time constants so that the higher gain region from the lag network and the one plateau from the lead network producing higher gain, are superimposed for maximum oscillator gain in the resonance region, and so that the other plateau from the lead network lies on the low frequency side of the resonance frequency, reducing amplifier gain below said frequency. Preferrably, the lower frequency break of the lag network and the higher frequency break of the lead network are closely spaced about the resonance frequency so that the phase response of the lag network has a significant slope while the phase response of the lead network has a significant slope of opposite sign at the resonance for frequency stability. The oscillator is further designed to have a gain which from d.c. to near resonance remains close to, but less than, unity to insure that the oscillator remains quenched.

More particularly, in application to a synchronous detection arrangement, the lead lag oscillator employs three transistors, one pair providing positive feedback to the first transistor, and also providing an output current balancing the emitter current in the first transistor. The oscillator is coupled at its output terminal and at the emitter of the first transistor to the paired collector of a Q demodulator of a TV synchronous detector. The connection shares the bias currents between the oscillator and the Q demodulator in power conserving manner, provides the path for injection of low frequency oscillator output into the frequency control network; and provides the return path of demodulated low frequency oscillator output, back into the oscillator which produces the quenching action, once the signal has been locked in.

BRIEF DESCRIPTION OF THE DRAWING

The novel and distinctive features of the invention are set forth in the claims appended to the present application. The invention, itself, however, together with the further objects and advantages thereof may be best understood by reference to the following description and accompanying drawings in which:

DESCRIPTION OF THE PREFERRED EMBODIMENT

Figures 1, 2, 3A, 3B:
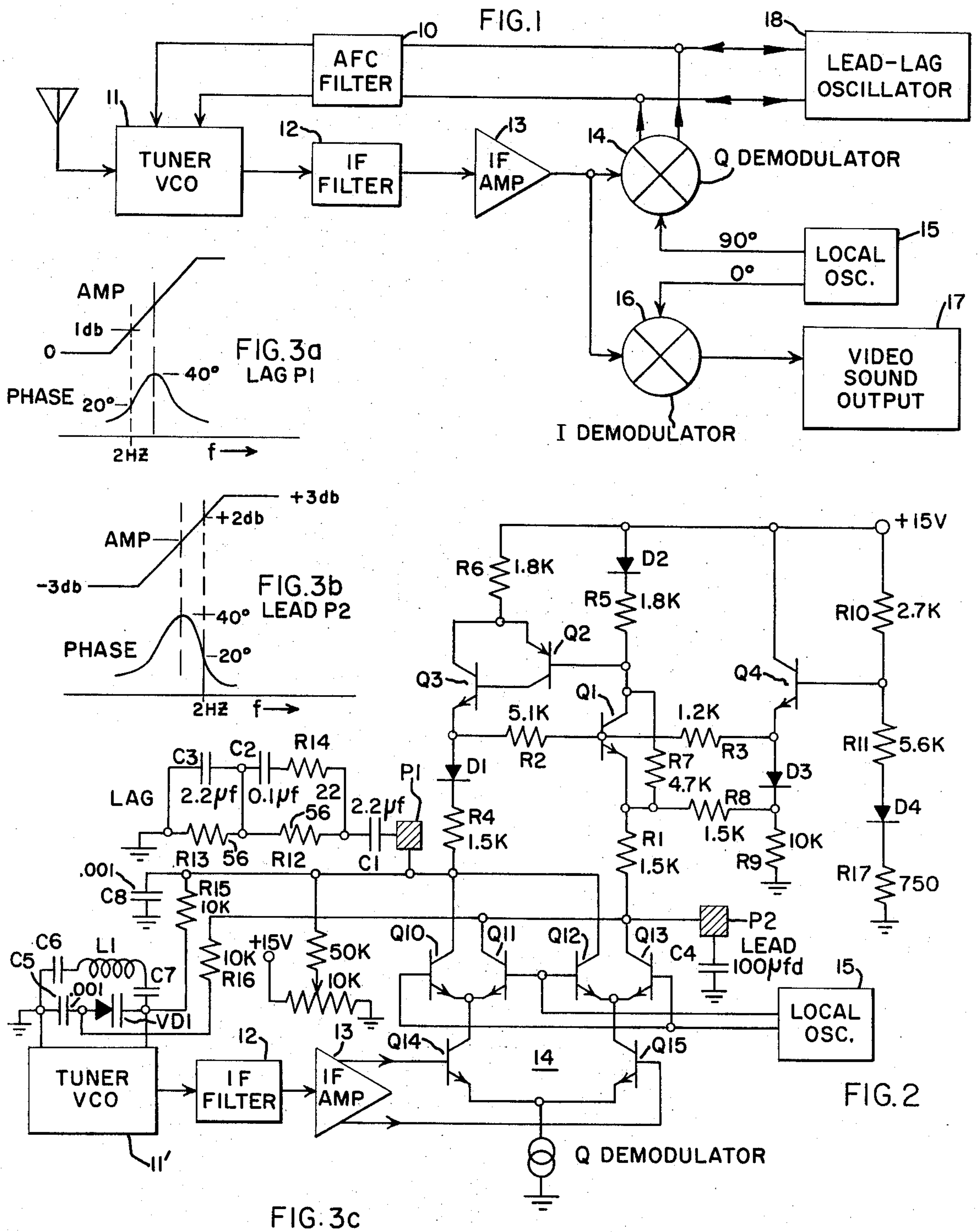
FIG. 1 is a block diagram of a signal acquisition network in accordance with the invention as applied to a television receiver.
FIG. 2 is a mixed block and circuit diagram of the signal acquisition network illustrated in FIG. 1 and particularizing the principal circuit details.
FIG. 3*a* is a graph illustrating the phase and amplitude response of the lag network in the vicinity of resonance.
FIG. 3*b* is a graph illustrating the phase and amplitude response of the lead network in the vicinity of resonance.

Referring now to the block diagram of FIG. 1, the signal acquisition network is shown in a television receiver application. The network includes a tuner 11, whose oscillator is subject to voltage control, a channel selection filter 12, an intermmediate frequency amplifier 13, separate I and Q branches 14 and 16 of a synchronous detector, a local oscillator 15 supplying the separate branches of the synchronous detector with waves at intermediate frequency at reference and quadrature phases, respectively, video and sound output 17 associated with the I branch (16) of the synchronous detector, and finally an AFC filter 10 and a lead-lag oscillator 18 associated with the Q branch (14) of the synchronous detector. The output of oscillator 18 is used in the signal acquisition process.

Considering the signal path through the receiver; an antenna couples remotely transmitted signals to the tuner 11; the tuner converts the selected signal to a predetermined intermediate frequency; and the converted signal is passed through the channel selection filter 12 to the intermediate frequency amplifier 13 for further amplification. The signal is then supplied from the intermediate frequency amplifier to the I detector or demodulator 16 which is a four-quadrant multiplier to which local oscillations at the intermediate frequency are also applied from oscillator 15. The signal modulation appears as a product term in the demodulator output when the zero phase output supplied from the local oscillator is at the precise frequency of the signal and in phase therewith. The detected output takes the form of a fluctuating "D.C." term of a polarity dependent upon the phase of the local oscillator. The fluctuations in the detected output contain the television signal information stripped from the principal carrier. In other words, the luminance portion of the video signal is at base band, the chrominance portion of the signal remains on its color subcarrier, and the audio signal remains on the audio carrier. These demodulator output terms are then supplied to the video and sound output 17.

The synchronous detection process outlined above requires a frequency and phase control loop to maintain the required in phase relationship between the signal and the locally generated wave supplied to the I demodulator. The Q branch (14) of the synchronous detector serves as the detector of any frequency or phase error in the automatic frequency control loop. It is also a four quadrant multiplier to which both the signal from the intermediate frequency amplifier and waves from the local oscillator 15 are applied. Here, however, the waves of the local oscillator are shifted 90° so as to be in quadrature with respect to the intermediate frequency signal. Assuming that both the signal and the local oscillator are at the same frequency, a fluctuating d.c. product term will be created in the output of the Q demodulator which indicates when precise phase quadrature exists between the signal and the locally generated waves. At quadrature, the d.c. product term will go through a null, switching from a condition of one polarity to one of opposite polarity. Furthermore, this d.c. quantity has a polarity which indicates whether the phase of the local oscillator is leading or lagging the signal. The d.c. output is then applied through a low pass, AFC filter 10 to the voltage control input of the high frequency oscillator of the tuner 11. The connections are made to the tuner in a sense to provide the desired polarity of "I" detection, but are not of consequence in determining proper AFC loop operation. If the connections are reversed, the loop will behave in exactly the same manner. Thus, the automatic frequency control network will seek to correct for errors in drift in the high frequency oscillator of the tuner 11, and at the same time correct for drift in the local oscillator 15. Once a signal has been acquired, the present system resembles a conventional AFC system in its mode of operation.

However, during the signal acquisition process, a "dither" signal is introduced in the AFC loop, which allows signals to be acquired which are well outside the normal pull in range. The low frequency dither is supplied by the oscillator 18 to the automatic frequency control network, at the output of the Q demodulator during signal acquisition. Once the signal is properly acquired (i.e. the loop is "locked" on the signal) the dither automatically quenches and the circuit returns to operation as a conventional automatic frequency control loop. The "dither" waveform is added to whatever control voltage already exists on the automatic frequency control bus and causes the voltage controlled oscillator of the tuner 11 to sweep through a wide range of frequencies. If a received signal falls within this tuning range, the AFC loop will quickly develop the d.c. value required to tune in and lock on to that signal. At the moment when "lock in" occurs, the low frequency oscillator which, as will be explained, has a carefully controlled latent gain, is quenched by the appearance of its own output in degenerative phase at the Q demodulator output.

The low frequency term of the lead lag oscillator 18 can only appear in the demodulator output and be applied to the AFC loop when the "dithered" received signal is phase locked with the local oscillator 15 to return the dither to its own original "base-band" frequency. The low frequency is typically of from 2 to 10 hertz, the former figure being used in the present practical embodiment. Once the low frequency oscillator is quenched after lock in, the AFC bus operates in a normal mode. The signal acquisition process typically encompasses a frequency range of about a channel (± 3 MHz) and permits one at the same time to use a narrow bandwidth AFC filter suitable for accurate and noise free frequency/phase control.

A more detailed understanding of the present signal acquisition network may be obtained by a consideration of the circuit diagram of FIG. 2. The circuit diagram in FIG. 2 reproduces certain of the principal blocks illustrated in FIG. 1 omitting the I demodulator and the video sound output block which are not a part of the AFC network proper.

Referring now to FIG. 2, the voltage controlled oscillator of the tuner 11 is shown provided with a voltage controlled resonant circuit illustrated outside the block 11' and comprising a variable capacitance diode VD1, capacitors C5, C6, C7 and an inductor L1, all coupled in a single loop. The resonant circuit operates in a parallel resonant mode, the variable capacitance diode VD1 having a capacitance value which varies as a function of applied voltage and which shifts the resonant frequency of the oscillator accordingly. The tuning voltage is applied across the tuning diode through a pair of RC filters R15 C8 and R16 C5 for preventing high frequency feedthrough. The voltage tuned circuit is conventional. As previously noted, the output of the tuner 11' is coupled through an intermediate frequency filter 12 to the intermediate frequency amplifier 13. The amplifier 13 has complementary outputs which are coupled to the Q demodulator 14. The Q demodulator comprises four transistors Q10, Q11, Q12, Q13 in an upper rank driven by lower rank transistors Q14, 15. The intermediate frequency amplifier is differentially coupled between the bases of the lower rank transistors Q14, Q15 which in turn drive the emitters of the paired upper rank transistors. At the same time, the output of the local oscillator 15 is coupled to the paired bases of the upper rank transistors.

Complementary d.c. outputs, whose sign is indicative of phase error, result from a four quadrant multiplication of the input quantities. These outputs appear at the paired collectors of Q10, Q12 and Q11, Q13. After both low and high frequency filtering, this output is used for frequency control of the voltage controlled oscillator at the tuner 11'.

As shown in FIG. 2, one demodulator output is taken from the paired collectors of transistors Q10, Q12, while another output is taken from the paired collectors of transistors Q11, Q13. The first collector pair are coupled to the pad P1(which in an external connection point when the circuit is in integrated circuit form)and to the ungrounded terminal of the variable capacitance diode VD1. The paired collectors of Q11, Q13 are coupled to the pad P2 and to the ground end of the variable capacitance diode VD1. Assuming a phase lcoked condition, the d.c. voltage across the AFC output connections will vary from one polarity (potential at P1 positive with respect to that at P2) through zero ($P_1 = P_2$) to the opposite polarity ($P_1$ negative with respect to $P_2$), to correct for detuning and to maintain phase lock between the IF signal and oscillator output. The d.c. voltage is filtered both for high frequency (R15, C8, R16 C5) and for low frequency prior to application to VD1. Also coupled to the phase control loop is the lead-lag oscillator 18 and its accompanying filters which provide low frequency filtering, and establish the resonant frequency of the oscillator. The circuit details of the oscillator will now be described.

The oscillator 18 is a lead-lag oscillator which is connected within the AFC loop and is quenched as the loop becomes active. Using a common definition, Shea, "Transistor Circuit Engineering," John Wiley and Sons, Inc., 1957, pages 221, 222, the oscillator falls into the category of harmonic oscillators (not relaxation). Characteristic of such oscillators "the regenerating action" is derived "through a feedback circuit which has the required amplitude and phase characteristic to cause oscillation. Thus, the frequency of oscillation is largely determined by the characteristics of this feedback network." The "lead-lag" networks, the P2, P1 connected filters, support the terminology "lead-lag". They are mutually isolated, but may be regarded as being connected in series in the positive feedback path. They establish the resonant frequency in a manner that is generally independent of bias supply variation and other factors. The oscillator 18 provides a low frequency (approximately 2Hz) output to the AFC control loop at pads P1, P2. The oscillator output is approximately in phase at these pads, with the much larger amplitude appearing at P1. The oscillator output may be coupled push-pull for VHF tuners (or single ended) and single ended for UHF (or push-pull).

The oscillator circuit comprises transistors Q1 to Q4, diodes D1 to D4, and resistances R1 to R11 and R17. The oscillator also includes the filters whose components are associated respectively with the pads P1, P2. The filter associated with P1 effectively includes capacitors C1 and resistances R2, R3 and R4. The filter associated with P2 effectively includes R1, R8 and C4. The oscillator utilizes the current from the bias source passing through the collectors of the Q demodulators.

In the oscillator circuit, the transistor Q1 and Q2, Q3 are the active elements in wave generation. The transistor Q1 drives the high beta Q2, Q3 "compound" transistor in an unbalanced to balanced circuit which provides regenerative feedback to Q1. The NPN transistor Q1 has its emitter coupled through resistance R1 to the pad P2 and collector pair of demodulator transistors Q11, Q13 from which it derives emitter current. The base of transistor Q1 is coupled through resistance R2 to the emitter of transistor Q3 and through resistance R3 to a fixed d.c. voltage at a point of low a.c. impedance to ground. The resistances R2 and R3 form a voltage divider for applying regenerative feedback from Q2 Q3 to Q1.

Continuing, the collector of NPN transistor Q1 is coupled through serially connected load resistances R5 and diode connected transistor D2 to the positive bias source. The collector of transistor Q1 is also coupled to the base of PNP transistor Q2 (the input member of the transistor compound Q2, Q3). The emitter of Q2 is led through resistance R6 to the positive bias source. Diode D2 is made to electrically and physically simulate the input junction of Q2, and resistances R5 and R6 are made equal, so that the collector current from Q1 in its load will create an equal emitter current in Q2. The collector of Q2 is connected to the base of NPN transistor Q3 (the output member of the compound), and the collector of Q3 is returned to the emitter of Q2 to complete the high beta compound configuration. The compound transistor Q2, Q3 provides at the emitter of Q3 an accurately replicated copy of the emitter current in Q2. The emitter current in Q3 returns through its load comprising diode connected transistor D1 and resistance R4 (made equal to the resistance R1 in the emitter path of Q1) to the pad P1 and the collector pair Q10 Q12 which supply its emitter current. Thus, the foregoing circuit configuration will cause the emitter current of Q3 to try to replicate the emitter current in Q1. The emitter signal currents in both Q1 and Q3 flow away from (or both toward) their load in a "balanced" mode. The oscillator output waveform appears at the respective pads P1 and P2, which due to a lower impedance filter at P2 than at P1, makes the maximum output appear at pad P1.

The transistor Q4, diodes D2 – D4, and resistances R5 – R11 and R17 make up the biasing circuitry for the transistor Q1 and the compoung transistor Q2, Q3. As previously noted, the emitter currents of transistor Q1 and of the transistor Q3 of the compound transistor are supplied from the separate collector pairs of the Q demodulator 14, a measure which avoids increasing the power consumption beyond that already necessary for the Q demodulator alone. The collector current of PNP transistor Q3 flows through resistance R6, coupling it to the source of positive bias potentials. The base potential of Q2 is established by a voltage divider comprising serially connected diode D2, resistance R5, resistance R7 (coupled between the collector and emitter of transistor Q1), resistance R8 coupled to the emitter of Q1 and resistance R9 coupling the remote terminal of R8 to ground.

The biasing network for the base of Q1 requires the remaining components. A transistor Q4 is provided having its base coupled to a voltage divider comprising resistance R10, resistance R11, diode connected transistor D4, and resistance R17 connected in the recited order between the positive bias source and ground. The base of Q4 is coupled to the connection between R10 and R11. The emitter of Q4 is led through diode D3 poled for easy current flow, and resistance R9 to ground. The resistance R9 is large (10K) to insure forward biasing of diode D3 and the input junction of Q3. The connections establish the emitter of Q4 at a stable d.c. potential. Both terminals of the diode D3 are of low a.c. impedance to ground.

The oscillator with its positive feedback loop through Q1 Q2 exhibits about 2 db of "latent" forward gain, while to quench the oscillator during lock in, the demodulator must provide an at least equal degenerative feedback gain. The d.c. gain in the signal paths of the active transistors Q1 and Q2, Q3 may be calculated in an approximate manner as follows:

D.C. gain $R5/R8 \,.\, R5/R6 \,.\, (R2+R3)/R6 \,.\, R3/(R2+R3)$ $1.8/1.5 \,.\, 1.8/1.8 \,.\, 1.2/1.8 = 1.2/1.5 = 0.8$ The measured d.c. gain is somewhat smaller (0.7).

The a.c. gain above two cycles, and neglecting momentarily any loss due to the filter networks at P1 and P2, calculates to a value in excess of 3 db:

A.C. gain $R5/R8//R1 \,.\, R5/R6 \,.\, R3/R6 = 1.8/0.75 \,.\, 1.8/1.8 \,.\, 1.2/1.8 = 1.2/0.75 = 1.6$ The measured a.c. gain is somewhat smaller, being 1.5 or slightly over 3 db. The filters at P1 and P2 establish the resonant frequency at about 2 Hz and reduce the latent forward a.c. gain of the oscillator to about 2 db at this frequency.

The first filter at pad P1 and coupled to the emitter of Q3 is the lag filter. It includes the components D1, R4, C1, C2, C3, and R12, R13 and R14; and R2 and R3, the emitter connected impedances. The external impedances coupled to the pad P1 comprise a capacitor C1 (2.2 microfarads) which has its remote terminal coupled to ground through two paths. The first path comprises serially connected resistances R12 (56 ohms) and R13 (56 ohms), while the second path comprises serially connected resistance R14 (22 ohms), capacitor C2 (0.1 microfarad), and capacitor C3 (2.2 microfarads). These two paths are bridged at the junctions of R12 and R13 and the junctions of C2 and C3.

In the region of resonance (2 hertz), the filter at P1 may be most simply regarded as comprising the series circuit of R2 and R3 connected in shunt with the series circuit of R4 and C1, both series circuits being coupled between the emitter of Q3 and ground. These impedances (R2 + R3), (R4) and (C1) form a doublet producing two "breaks" in the oscillator gain in the region of several cycles, going from one gain plateau to a lower gain plateau. The filter exhibits a phase shift characteristic peaking in the middle of the two breaks. Assuming an operating frequency of 2 hertz, the P1 filter is operating near the first, lower frequency break, and provides a lagging phase characteristic, typically of about 20°, and having an upward slope. The lag filter characteristics are illustrated in FIG. 3a.

The filter at pad P2 coupled to the emitter of Q1 is the lead filter. It includes the components R1 and C4 coupled in series between this emitter and ground. The oscillator source impedance (R8) shunts the series circuit formed by these elements to form a second doublet. This doublet produces an oscillator output characteristic whose gain "breaks" twice in the region of 1 hertz to a higher gain plateau, and exhibits a phase shift characteristic peaking in the middle of that region. Assuming an operating frequency of 2 hertz, the P2 lead filter is operating near the second higher frequency break, and provides a leading phase shift characteristic of about 20°, and having a downward slope. The lead filter characteristics are illustrated in FIG. 3b.

Figure 3C:
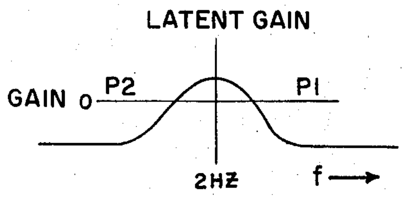
FIG. 3*c* is a graph illustrating the latent gain of the oscillator in the vicinity of resonance.

Since oscillator resonance occurs at the point where the "lead" and "lag" phase shifts are precisely equal to establish a purely regenerative gain condition about the oscillator loop, the foregoing parameters establish a natural resonance frequency at about 2 hertz. The effect of the filters at P1 and P2 is to slightly reduce the latent forward a.c. gain of the negative resistance oscillator to about 2 db at resonance. The amplifier gain characteristic is plotted in FIG. 3*c*. Because the slope of the phase shift characteristics are of opposite sign at the resonance point and of substantial slope, the operating frequency is particularly stable, and is not subject to appreciable pulling with changes in load or biasing conditions.

The foregoing oscillator configuration will oscillate softly at the circuit resonance point producing a nearly sinusoidal waveform. The filters at pad P1 and P2 set the outer frequency limits between which oscillations can take place. These limits are closely spaced. The lower limit corresponds to the upper frequency break of the lower frequency P2 filter 1½ db below its upper plateau, slightly above 2 hertz. The upper limit corresponds to the lower frequency break of the higher frequency P1 filter, at about 1½ db down from the upper plateau. This point is slightly under 2 hertz. Since oscillation can only occur when the $\mu\beta$ of the amplifier exceeds unity, and is precluded when the $\mu\beta$ falls below unity, the frequency is normally fixed.

Thus, it may be seen that if one provides degenerative feedback to the oscillator 18 in excess of the 2 db latent forward a.c. gain at 2 hertz, that the overall oscillator gain will be negative in db (or less than unity), and oscillations will be quenched. The quenching function is provided by the AFC loop when locked in to an incoming signal.

Assuming that the oscillator 18 has been oscillating at 2 hertz, as one has set the tuner 11' to a new channel, the voltage controlled oscillator in the tuner 11' will slowly be swept over a range of frequency which causes the received signal corresponding to the selected channel to pass through the frequency required for synchronism with the local oscillator 15. Under normal signal conditions, when the dither voltage assumes a value which corresponds to that required for a zero beat note or lock-in, the dither voltage stops changing and maintains said value indefinitely. Assuming that the tuner is of the push button or detent type, one may expect appreciable mistuning. Accordingly, synchronism will occur with a non-zero d.c. potential between the pads P1 and P2 at the demodulator outputs.

At the moment when phase lock occurs, the lead-lag oscillator 18 is quenched. Prior to synchronism between the signal and the local oscillator at the Q demodulator, the "dither" was opposed ineffectually, by noise. However, after phase lock, the situation has changed. When the AFC loop is operative a feedback condition exists which opposes the introduction of all external perturbations including the tendency of the dither oscillator to start oscillating. The effect of this degenerative loop response is to introduce degeneration into the oscillator 18 from the demodulator output terminals, sufficient to quench further oscillation.

The circuit, while depending in an essential way upon signal presence for the quenched oscillator to stay quenched, has quite modest signal demands. Typically, a TV signal well below viewability (1 microvolt) is quite adequate to retain the quenching action. The low dither frequency that has been selected derives its efficiency in pull-in from the fact that the AFC filters will integrate the vertical pulse content of the signal which occurs at a 60 hertz rate. Accordingly, in a television application the dither should be a small fraction 2 – 10 hertz of that value.

The invention, as previously noted, is an economic design. The capacitor C1 in the P1 lag filter is used at the same time as the AFC filter. In its capacity as the AFC filter, it contributes to a narrow band width of about 5 hertz at 3 db, which provides an extremely stable phase lock operation.

The current required for the oscillator 18 is shared with the Q demodulator, under conditions requiring negligible additional current to the total circuit. The circuit is intended for integrated fabrication. Thus, the component selection, minimum heat dissipation, and minimum pad count have all been considered with that usage in mind.

While the embodiment described has been to a television receiver, using a synchronous detector, the invention may be used in other than television systems, as for instance FM; nor should the invention be considered to be restricted to synchronous detection systems. The AFC loop must in all such systems be able, when locked in, to supply sufficient degeneration to quench the "dither" oscillator. This is a property generally shared by both non-synchronous and synchronous detection AFC systems.

The application to VHF or UHF can occur either with a fully voltage tuned high frequency oscillator, or with a mechanical tuner, wherein only the correction voltage is applied. The oscillator subject to control can either be the tuner oscillator, which is normally preferable, or the synchronous detection oscillator.

Finally, the lead-lag oscillator, which has been constituted without inductors, appears to be particularly well suited to the quenching action. A relaxation oscillator is not nearly as desirable because its gain as a function of time is violently on for a short period and off for most of the time. Thus, the loop requires higher gain to stop the dither if lock should try to occur at an unfavorable time. Its gain can be regulated so closely below unity outside the narrow frequency spectrum of resonance that it is unlikely to unquench. The effect of the quiescent oscillator, and in particular its lead-lag filters, is not deteriorative of the phase lock loop. They are consistent with a narrowing of the upper band limits of the AFC loop and aid in the high frequency filtering, and do not introduce any undesirable loading. While both lead-lag filters have been disclosed as doublets, the lag filter need not have this property, but may have a continuous high frequency roll off, corresponding to the desired upper limits of the AFC filter.

While the principal embodiment has shown a synchronous detector having a phase lock characteristic in an automatic frequency control loop, one may employ a discriminator having a frequency discrimination characteristic instead.

What I claim as new and desire to secure by Letters Patent of the United States is:

1. A signal acquisition network for use in a reception system comprising:

a. a first oscillator having a predetermined latent forward gain and oscillating at a given low frequency,
b. an automatic phase/frequency control network comprising:

1. a second, voltage controlled oscillator
2. means coupling the output of said first oscillator to said second oscillator to cause the frequency of the latter to swing over a range exceeding the lock-in range of said control network for signal acquisition, and
3. a detector to the input of which a signal being acquired is applied and whose output is coupled to said first and said second oscillators, said detector developing an error signal to maintain said second oscillator and said signal in proper phase relationship for demodulation once lock-in has occurred, and said detector
   quenching said first oscillator once lock-in has occurred by coupling thereto demodulated oscillations of said first oscillator in degenerative phase, said control network, when said signal exceeds a minimum low level, exhibiting a gain at said first oscillator frequency at the detector output in excess of said latent forward gain.

2. A signal acquisition network as set forth in claim 1 wherein said first oscillator is a harmonic oscillator having a lead RC phase shift network and a lag RC phase shift network for establishing the resonant frequency at the point at which the phase shifts are equal and opposite in sign.

3. A signal acquisition network as set forth in claim 2 wherein said first oscillator has:

1. a three electrode gain element having two input electrodes and an output electrode, and
2. a positive feedback connection from said output electrode to a first input electrode and wherein
3. said lag RC network is coupled with said first input electrode and said lead RC network is coupled to said second input electrode.

4. A signal acquisition network as set forth in claim 3 wherein 1. said lead RC phase shift network is a doublet having an amplitude response which transitions from one plateau to a second different plateau by a path having a first and a second break; and wherein
2. the time constants of said respective phase shift networks are adjusted so that the higher gain region from said lag network and one plateau from said lead network producing higher gain are superimposed for maximum oscillator gain at said resonant frequency and wherein the other plateau from said lead network lies on the low frequency side of said resonance frequency reducing amplifier gain below said resonant frequency.

5. A signal acquisition network as set forth in claim 4 wherein the break of said lag network and the higher frequency break of said lead network are closely spaced about resonance so that the phase response of said lag network has a significant slope while the phase response of said lead network has a significant slope of opposite sign at resonance for frequency stability.

6. A signal acquisition network as set forth in claim 5 wherein said oscillator has a gain from d.c. to near resonance which remains close to but less than unity to insure that the oscillator remains quenched.

7. A signal acquisition network as set forth in claim 6 wherein said gain element is a first transistor whose base, emitter and collector electrodes are said first input, second input and output electrodes, respectively; wherein said positive feedback connection provides an output current at an output terminal balancing the emitter current of said first transistor, and contains a second transistor of a complementary conduction type, said second transistor ($Q_2$) having base, emitter and collector electrodes, said base electrode being coupled to the collector of said first transistor; wherein said lag RC network comprises a first resistance (R4) and a capacitor (C1) connected in series between said output terminal and ground, and a second resistance (R2 + R3) connected to said output terminal and in shunt for a.c. with said series elements; and wherein said lead RC network comprises a first resistance (R1) and a capacitor (C4) connected in series between the emitter of said first transistor ($Q_1$) and ground, and a second emitter connected resistance (R8) in shunt for a.c. with said last recited series elements.

8. A signal acquisition network as set forth in claim 7 wherein said detector is a synchronous detector and includes a Q demodulator in a four quadrant multiplier configuration having two pairs of output collectors at which complementary AFC voltages appear; and wherein said emitter electrode of said first transistor ($Q_1$) is coupled to one collector pair through said first emitter connected resistance (R1) and wherein said output terminal is coupled to said other collector pair through said first output terminal connected resistance (R4) to share bias current between said oscillator and said Q demodulator; and wherein said lag capacitor (C1) has a value suitable for low frequency AFC filtering.

9. A signal acquisition network as set forth in claim 8 wherein said lead capacitor (C4) has a large value in relation to said lag capacitor, to reduce the magnitude of the swing of said first oscillator output at the other collector pair in relation to that at said one collector pair, both said RC networks providing high frequency AFC filtering at said collector pairs.

10. A signal acquisition network as set forth in claim 9 wherein said positive feedback connection contains a third transistor ($Q_3$) of high $\beta$ of the same conduction type as said first transistor ($Q_1$) having base, emitter and collector electrodes and having its base connected to the collector of said second transistor, its collector coupled to the emitter of said second transistor, and its emitter coupled to said output terminal; and wherein said second resistance (R2 + R3) coupled to said output terminal has a tap coupled to the base electrode of said first transistor for providing said regenerative feedback connection.

11. A signal acquisition network as set forth in claim 9 wherein said second oscillator is a high frequency oscillator for converting said signal to an intermediate frequency for synchronous detection.

* * * * *